A. ANGELL.
Coffee Huller.
No. 59,538. Patented Nov. 13, 1866.
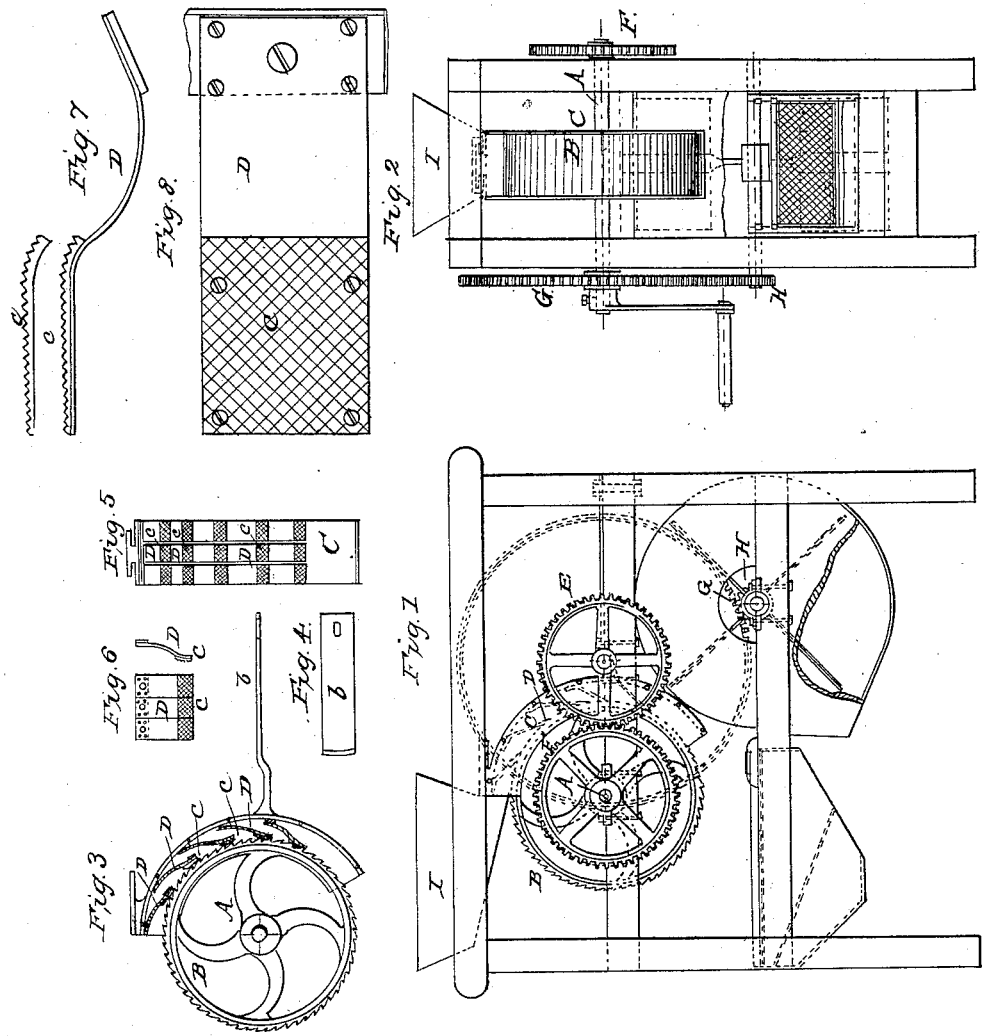

UNITED STATES PATENT OFFICE.

ALBERT ANGELL, OF NEWBURG, NEW YORK.

IMPROVEMENT IN COFFEE-HULLERS.

Specification forming part of Letters Patent No. 59,538, dated November 13, 1866.

*To all whom it may concern:*

Be it known that I, ALBERT ANGELL, of Newburg, in the county of Orange and State of New York, have invented a certain new and useful Improvement on Coffee - Hullers, of which the following is a full, clear, and exact description, reference being had to the accompanying drawings, forming part of this specification, and in which—

Figure 1 represents a side view of a coffee-hulling machine constructed according to my improvement; Fig. 2, a partly-sectional end elevation thereof; Fig. 3, a sectional elevation of the hulling mechanism proper; and Figs. 4, 5, 6, 7, and 8, views of details detached and, in part, on an enlarged scale.

Like letters indicate corresponding parts throughout the several figures.

The nature of my invention consists in the combination, with a serrated wheel or cylinder, of a series of serrated spring-strippers arranged within a hollow or trough-like segment partly encircling the cylinder, which is made to revolve while the segment with its strippers remains stationary, the hull being detached from the berry of the coffee by the action of the cylinder and strippers as it is passed through the segment; and said invention further consists in a peculiar construction of the spring-strippers.

Referring to the accompanying drawings, the machine as represented may be variously constructed so far as its frame, gearing, fan, screen, and other details not immediately connected with my invention are concerned. Consequently little or no special reference will here be made to such parts.

Mounted on a horizontal shaft, A, is the hulling wheel or cylinder, B, of any desirable diameter and width on its periphery, which latter is serrated or otherwise suitably roughened to act in concert with serrated or roughened spring-strippers, as hereinafter described. I prefer, however, the periphery of said cylinder to have cut or formed across it teeth of a ratchet character, their bevel sloping backward relatively to the travel of the cylinder.

Embracing the periphery of the wheel B for a portion of its circumference is a stationary hollow segment or trough, C, within which the serrated portion of the wheel enters and works from the rear or inner side. This trough C is open at its ends, and has arranged within it a series of spring-strippers, D, secured at their one end to the interior of the periphery of the segment, while their other end, which is serrated or roughened, is made to lie in proximity to or against the serrated periphery of the cylinder B, relatively to which they may be adjusted by connecting the segment to the frame-work by a slotted arm, *b*. These spring-strippers should be of a curvilinear form to give them the necessary elasticity and action, and to secure to them a more accommodating effect or pliability to act on the whole surface of the unhulled berry. They may not only be arranged in a series, one in advance of the other, as represented in Fig. 3, but each stripper be divided into two, three, or more springs, arranged to lie side by side, as shown in Figs. 5 and 6 of the drawings. They may be serrated on their faces at their loose ends by bolting or fastening by screws serrated or roughened cast-iron plates *c* to the springs, as represented in Figs. 7 and 8.

E F are spur-wheels for giving the necessary rotary motion to the cylinder B, the shaft of one of said wheels carrying on the other side of the frame a wheel, G, which meshes into a wheel or pinion, H, secured to the shaft of a fan below, which shaft may carry an eccentric-pin to give a vibratory motion by rod to a screen or sifting-shoe arranged in front of the mouth of the fan. These several details, however, may be varied at pleasure, and any suitable prime mover be used to operate the machine.

I is the hopper, into which the coffee to be hulled is fed, and from whence it passes into the upper end of the segment C, where the hulls are stripped from it by the combined action of the cylinder B and spring-strippers D, as the cylinder B, in revolving, urges or forces the coffee through the segment; after which the hulls and berries, as they are delivered together from the lower end of the segment, are separated by the combined action of the fan and screen beneath.

What I claim herein as new and useful, and desire to secure by Letters Patent, is—

1. The combination, with the roughened or serrated hulling-cylinder B, of independent spring-strippers D, arranged within a hollow segment or trough partly encircling the cylinder, substantially as specified.

2. The divided spring-strippers D, constructed with roughened or serrated fronts, arranged side by side, and in a series one in advance of the other, within a hollow segment or trough, C, to which they are secured at their one end, for operation in combination with a serrated or roughened hulling-cylinder, B, essentially as shown and described.

ALBERT ANGELL.

Witnesses:
A. LE CLERC,
J. M. COOMBS.